(12) United States Patent
Leopold et al.

(10) Patent No.: US 7,943,850 B2
(45) Date of Patent: May 17, 2011

(54) ENVIRONMENTALLY SEALED WIRING DEVICE WITH REMOVABLE WEATHER-RESISTANT COVER

(75) Inventors: Howard S. Leopold, Fayetteville, GA (US); David R. Byers, Peachtree City, GA (US); Jim Knapik, Fayetteville, GA (US)

(73) Assignee: Cooper Technologies Company, Houston, TX (US)

(*) Notice: Subject to any disclaimer, the term of this patent is extended or adjusted under 35 U.S.C. 154(b) by 294 days.

(21) Appl. No.: 12/242,075

(22) Filed: Sep. 30, 2008

(65) Prior Publication Data

US 2010/0078189 A1 Apr. 1, 2010

Related U.S. Application Data

(63) Continuation-in-part of application No. 12/242,042, filed on Sep. 30, 2008.

(51) Int. Cl.
*H02G 3/08* (2006.01)
(52) U.S. Cl. ............... 174/50; 174/58; 174/66; 174/67; 439/535; 248/906
(58) Field of Classification Search .................. 174/50, 174/58, 66, 67; 220/4.02; 248/906; 439/535
See application file for complete search history.

(56) References Cited

U.S. PATENT DOCUMENTS

| | | | |
|---|---|---|---|
| 3,186,574 A | 6/1965 | Davidson | |
| 4,915,638 A | 4/1990 | Domian | |
| 4,988,832 A | 1/1991 | Shotey | |
| 5,228,584 A | 7/1993 | Williams, Jr. | |
| 5,317,109 A | 5/1994 | Aldissi | |
| 5,387,761 A | 2/1995 | Simonis | |
| 5,527,993 A | 6/1996 | Shotey et al. | |
| 5,533,637 A | 7/1996 | Williams, Jr. | |
| 5,621,192 A | 4/1997 | Bordwell et al. | |
| 5,773,760 A | 6/1998 | Stark et al. | |
| 6,028,268 A | 2/2000 | Stark et al. | |
| 6,519,208 B2 * | 2/2003 | DeVries | 368/10 |
| 7,381,890 B1 * | 6/2008 | Kinnard et al. | 174/50 |
| 7,479,598 B1 * | 1/2009 | Shotey et al. | 174/58 |
| 7,619,162 B2 * | 11/2009 | Dinh et al. | 174/58 |
| 2010/0078190 A1 | 4/2010 | Leopold | |

* cited by examiner

*Primary Examiner* — Dhiru R Patel
(74) *Attorney, Agent, or Firm* — King & Spalding LLP

(57) ABSTRACT

An environmentally sealed wiring device with removable weather-resistant cover includes a wiring device with a device housing, a shoulder extending from the device housing and a sealing element disposed about the shoulder. The wiring device includes wires extending through one or more openings in the device housing. The openings are environmentally sealed around the wires to prevent moisture from entering the device. A weatherproof cover housing includes a pair of openings. The wiring device is positioned next to, and sometimes through, one of the openings. The sealing element is disposed between the weatherproof cover housing and the shoulder of the wiring device, providing a weatherproof seal therebetween, to prevent moisture from entering the device. A door is coupled to the weatherproof cover housing and can be rotated about an axis along an edge of the weatherproof cover housing between an open position and a closed position.

18 Claims, 9 Drawing Sheets

ENVIRONMENTALLY SEALED WIRING DEVICE WITH REMOVABLE WEATHER-RESISTANT COVER

CROSS-REFERENCE TO RELATED APPLICATION

The present application is a continuation-in-part of the following co-pending application: U.S. patent application Ser. No. 12/242,042, filed on Sep. 30, 2008, the disclosure of which is incorporated herein by reference.

FIELD OF THE INVENTION

The present invention relates generally to the field of electrical outlet devices. More particularly, the invention relates to a environmentally sealed wiring device with a removable weather-resistant cover.

BACKGROUND

Weatherproof covers for protecting devices installed outdoors, such as receptacles and switches, against the effects of the elements (e.g., rain, moisture, and dust) are well known. Typically, such covers include a housing and a hingable door that is sized to receive a portion of a device, such as a ground fault circuit interrupter device ("GFCI"), single gang receptacle, or double gang receptacles and the like. The weatherproof cover can be attached to wallbox or electrical outlet box that houses the remaining portion of the electrical device, and incorporates a gasket material placed between the weatherproof cover and the outlet box or wall surface.

The device typically includes one or more terminals along its back or side surface for electrically coupling wires to an electrical source, switch, or device. The door portion for the weatherproof cover can have openings for electrical cables, so that the door can be closed even when cables are attached to the device, e.g., when an electrical plug is attached to a receptacle. Examples of the foregoing enclosures can be found in U.S. Pat. Nos. 6,028,268 and 5,773,760 to Stark et al.; U.S. Pat. Nos. 5,533,637 and 5,228,584 to Williams, Jr.; U.S. Pat. No. 5,317,109 to Prairie, Jr.; and U.S. Pat. No. 4,915,638 to Domian.

The weatherproof covers of the prior art, however, have a disadvantage in that when water seeps in between the weatherproof cover and the structure the weatherproof cover is attached to, the water is able to reach the device. This water is able to penetrate the device and potentially cause a short circuit situation. Another disadvantage is that, when the water seeps between the structure and the weatherproof cover, the water can make its way along the top of the wallbox and into the wallbox through the openings intended to allow for wiring connections. From there, the water can gain access to the device and cause a short circuit.

What is needed in the art is a method and apparatus for environmentally sealing the device to the weatherproof cover and sealing the housing of the device behind the weatherproof cover, while still providing the ability to remove and replace the weatherproof cover as necessary, thereby preventing water from accessing the device.

SUMMARY OF THE INVENTION

A sealed device with removable weatherproof cover provides improved protection for devices, such as GFCI outlets, from the elements, including water. The sealed device with removable weatherproof cover provides a wiring device that includes wires, for coupling to electrical sources, switches, junction boxes or the like. The wires may extend through openings in the wiring device. These openings can be environmentally sealed from the elements to prevent moisture or other contaminants from entering the interior of the device. The wiring device can include a shoulder extending out along the periphery of one face of the wiring device, against which a sealing element can be placed or affixed. A weatherproof cover housing having walls and a faceplate can be releasably coupled to the wiring device, such that the weatherproof cover housing can be removed and replaced with the same or different weatherproof cover housing, which is subsequently coupled to the wiring device. As such, the shoulder can abut or extend though an opening in the weatherproof cover housing and the sealing element can be positioned between the wiring device and the weatherproof cover housing, thereby creating an weatherproof seal therebetween. In certain embodiments, the sealing element can be positioned between the shoulder of the wiring device and the edge of the aperture in the weatherproof cover housing.

For one aspect of the present invention, a sealed device with removable weatherproof cover can include a wiring device that includes a shoulder. A sealing element can be disposed along the shoulder of the wiring device. The wiring device can also include one or more wires extending out from the wiring device through one or more apertures in the wiring device. The apertures can be environmentally sealed around the wires to prevent moisture from passing into the wiring device. The weatherproof cover housing can include a pair of openings. The sealing element can be positioned between a portion of the weatherproof cover housing and the shoulder of the wiring device, such that the sealing element provides an weatherproof seal between the weatherproof cover housing and the wiring device, to prevent the introduction of moisture between the wiring device and the weatherproof cover housing. A door can be coupled to the weatherproof cover housing and positioned next to the other opening in the weatherproof cover housing. The door can be moved about an axis such that the door can be adjusted between an open position and a closed position.

For another aspect of the present invention, a sealed device with removable weatherproof cover can include a wiring device that includes an electrical receptacle, a device body or housing, a shoulder extending about a portion of the device body, and a sealing element positioned about at least a portion of the shoulder. The sealed device with removable weatherproof cover can also include a removable weatherproof cover housing that is releasably coupled to the wiring device and includes at least a pair of openings. A portion of the electrical receptacle can be positioned through one of the openings and the sealing element can be positioned between at least a portion of the weatherproof cover housing and the shoulder of the wiring device. A door can be rotatably coupled to the weatherproof cover housing and can be operable between an open position and a closed position.

For yet another aspect of the present invention, a sealed device with removable weatherproof cover can include a wiring device having a GFCI outlet, a device body, and one or more wires. The wires can include a first end, a second end, and a portion therebetween. The first end of the wire can be electrically coupled to the GFCI outlet. The portion of the wire between each end can extend out through openings in the device body. Each opening can be environmentally sealed around the portion of the wire extending therethrough, to prevent moisture from passing into the wiring device. The wiring device can further include a shoulder extending about at least a portion of the device body and a sealing element that includes a gasket. The gasket can be positioned about at least a portion of the shoulder. The sealing element can be positioned between the weatherproof cover housing and the shoulder. The weatherproof cover housing can be releasably coupled to the wiring device such that the weatherproof cover housing may be detached from the wiring device and replaced with another weatherproof cover housing. The weatherproof cover housing can include at least a pair of openings. A portion of the GFCI outlet can extend through one of the openings. In addition, a door can be rotatably coupled to the weatherproof cover housing and is operable between an open position and a closed position.

BRIEF DESCRIPTION OF THE DRAWINGS

For a more complete understanding of the exemplary embodiments of the present invention and the advantages thereof, reference is now made to the following description in conjunction with the accompanying drawings in which.

DETAILED DESCRIPTION OF THE EXEMPLARY EMBODIMENTS

Figure 1:
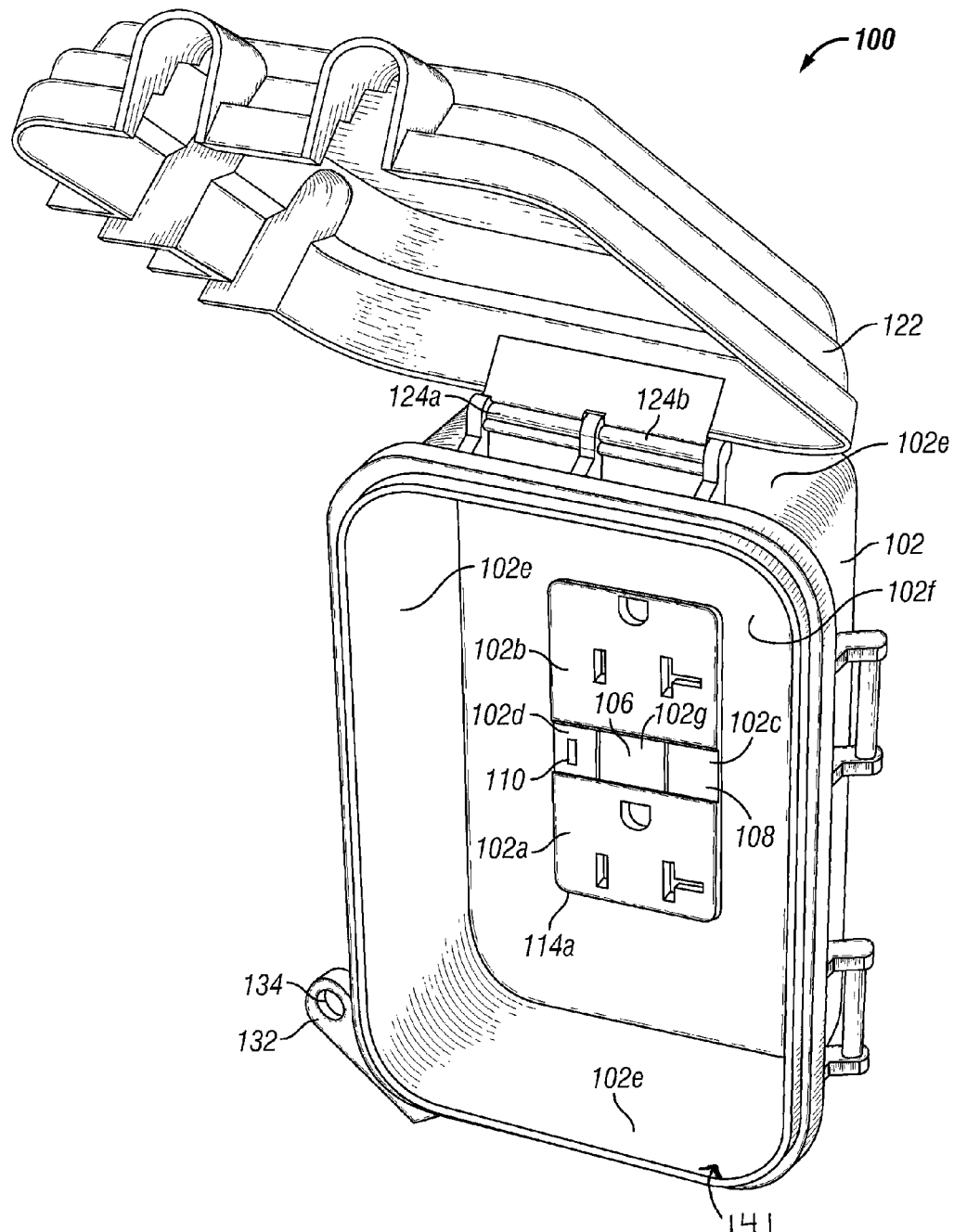
FIG. 1 is a front perspective view of a sealed device with integral weatherproof cover in an open configuration according to one exemplary embodiment of the present invention.

The present invention is directed to an environmentally sealed wiring device with removable weatherproof cover for preventing the introduction of moisture into the wiring device. The inventive functionality of the environmentally sealed wiring device with removable weatherproof cover will be explained in more detail in the following description and is disclosed in conjunction with the presented figures.

Referring now to the drawings in which like numerals represent like elements throughout the several figures, aspects of the present invention will be described. FIGS. 1-4 show perspective views of the sealed device with integral weatherproof cover (hereinafter "weatherproof cover") 100 according to one exemplary embodiment of the present invention. Now referring to FIGS. 1-4, the exemplary weatherproof cover 100 includes a weatherproof cover housing 102 that is integral with a device 104. In one exemplary embodiment, the device 104 can include wiring devices including, but not limited to, electrical outlet receptacles and/or a GFCI device.

The weatherproof cover 100 is customarily mounted in a vertical or upright position, since devices that would be covered by the weatherproof cover 100 are generally oriented vertically with respect to a support structure (e.g. a wall) to which the weatherproof cover 100 is attached. Based on the foregoing, the terms top, bottom, side, upper, lower, front, rear, left, and right, as used herein with respect to the weatherproof cover 100 are to be understood in the context of the weatherproof cover 100 being in an upright or vertical position as shown in FIGS. 1-4.

In certain exemplary embodiments, the weatherproof cover housing 102 and the device 104 are integral to one-another by molding the weatherproof cover housing 102 and the device 104 from plastic in a single molding process. In an alternative embodiment, the weatherproof cover housing 102 and device 104 are coupled during the manufacturing process. Those of ordinary skill in the art will recognize that several exemplary methods may be used to couple the weatherproof cover housing 102 to the device 104 including, but not limited to, a combination of fasteners and weatherproof caulking, an adhesive between the front of the device 104 and the back side 114 of the weatherproof cover housing 102, welding, and other known methods. In these exemplary embodiments, the device 104 and the weatherproof cover housing 102 are made integral or unitary prior to being offered for purchase at retail and are not generally capable of being separated from one another. In one exemplary embodiment, the coupling or interface 105 between the weatherproof cover housing 102 and the device 104 is environmentally sealed, making the coupling or interface 105 impervious to water or other environmental contaminants.

Figure 3:
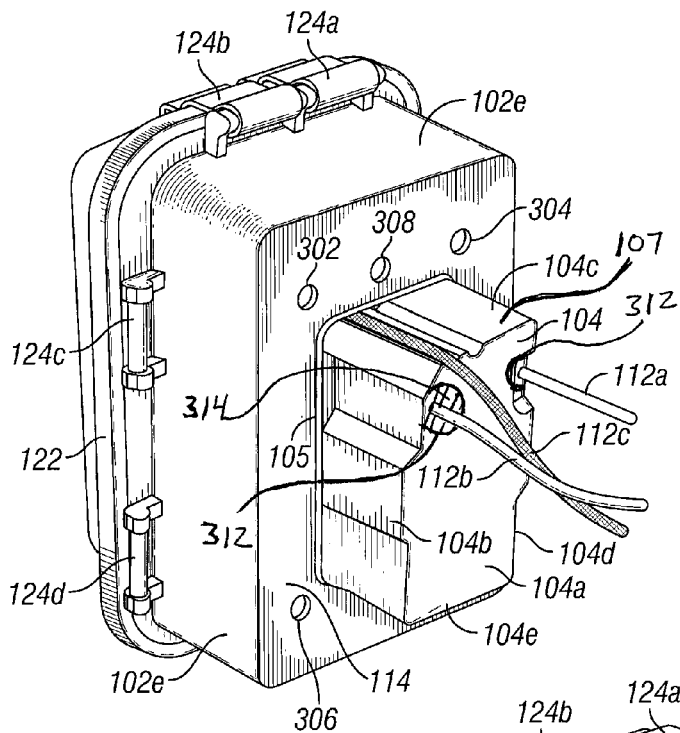
FIG. 3 is a rear perspective view of the sealed device with integral weatherproof cover in accordance with one exemplary embodiment of the present invention.

The device 104 has a six-sided generally box-like shape as shown in FIG. 3; however, the device 104 could have other geometrical shapes including, but not limited to, oval or circular with, or without, raised sides extending therefrom. The device 104 typically has a length, width, and depth sufficient in size to allow the device 104 to be placed within a wallbox (not shown). In one exemplary embodiment, the device 104 is dimensioned (i.e., sized, shaped, constructed, and arranged) to include a single gang receptacle 102a and 102b on the front side of the device 104. However, it is to be understood that a device 104 dimensioned to include smaller (e.g., a toggle switch) or larger (e.g., a double gang receptacle) sized devices is within the spirit of the present invention.

The exemplary device 104 includes a device body 107 that includes, for example, a back plate 104a having a generally rectangular shape and four walls 104b, 104c, 104d, and 104e. The four walls 104b, 104c, 104d, and 104e are each typically coupled on one end to and extend out from the back plate 104a and are coupled along the opposing end to, or integral with, the back side 114 of the faceplate 102f. In one exemplary embodiment, the back plate 104a and walls 104b, 104c, 104d, and 104e are integral to one another and environmentally sealed. While the back plate 104a is generally described as having a generally rectangular shape, the back plate 104a can be modified to have other geometric shapes and the number of walls 104b, 104c, 104d, and 104e extending out from the back plate 104a can be modified to comport with the shape of the back plate 104a or the particular needs of the application.

The exemplary device 104 also includes one or more wires (or electrical cables) extending out from openings 312 in the device 104. In one exemplary embodiment, the wires include a hot wire lead 112a, a neutral wire lead 112b, and a ground wire lead 112c extending out from the back plate 104a and/or the top wall 104c of the device 104. Those of ordinary skill in the art will recognize that one or more of the wire leads 112a, 112b, and 112c can alternatively pass through the side or bottom walls 104b, 104d, and 104e of the device body 107. The opening 312 where the wire leads 112a, 112b, and 112c pass through the device 104 is generally environmentally sealed in such a way as to prevent liquid from being able to pass along the wire leads 112a, 112b, and 112c and into the device 104. In one exemplary embodiment, the wire leads 112a, 112b, and 112c are environmentally sealed though the use of a solvent 314 applied about the particular wire at the opening 312; however, those of ordinary skill in the art will recognize that other methods of sealing the openings 312 exists including, but not limited to, welding, ultrasonic welding, pressure fitting, and cork. Each of the wire leads 112a, 112b, and 112c are coupled on their opposing ends to the single gang receptacle 102a and 102b or other device along the front of the device 104.

The weatherproof cover housing 102 has a five-sided generally box-like shape as shown in FIG. 1; however, the weatherproof cover housing 102 could have other geometric shapes including, but not limited to, oval and circular shapes with raised sides extending out therefrom. In certain exemplary embodiments, the weatherproof cover housing 102 has a length width, and depth sufficient in size to enable a door 122 to be closed even when the electrical connectors (e.g., plugs, electrical cables) are connected to a device receptacle 102a or 102b. In one exemplary embodiment, the weatherproof cover housing 102 is dimensioned (i.e., sized, shaped, constructed, and arranged) to allow it to be used with a single gang receptacle 102a and 102b of the integral device 104. However, it is to be understood that a weatherproof cover housing 102 dimensioned for use with smaller (e.g., a toggle switch) or larger (e.g., a double gang receptacle) sized devices is within the spirit of the present invention.

The exemplary weatherproof cover housing 102 includes a faceplate 102f having a generally rectangular shape and four walls 102e coupled to and extending out from the faceplate 102f and defining an opening 141. In one exemplary embodiment, the weatherproof cover housing 102 is made of molded plastic and the faceplate 102f and walls 102e are integral to one another and environmentally sealed. While the weatherproof cover housing 102 is described in the exemplary embodiment as being made from plastic, other materials known in the art may be used in the manufacture of the weatherproof cover housing 102 including, but not limited to, composites and metallic or semi-metallic materials. Furthermore, while the faceplate 102f is described as having a generally rectangular shape, the faceplate 102f can be modified to have other geometric shapes and the number of walls 102e extending out from the faceplate 102f can be modified to comport with the shape of the faceplate 102f.

The weatherproof cover housing 102 also is capable of receiving a portion of the device receptacles 102a and 102b, and openings 102c, 102d, and 102g of the device 104 through the opening 114a. Each of the device receptacle outlets 102a and 102b is adapted to receive a two-prong or three-prong electrical plug and, in combination, are generally referred to as a single gang electrical receptacle. The exemplary device 104 can also include a reset button 106 and a test button 108 extending into and/or through the openings 102g and 102c respectively, and an end of a light pipe 110 extending into and/or through the opening 102d. The weatherproof cover housing 102 may also include one or more exemplary mounting holes 302-308 (with a fifth and sixth mounting hole not shown) (of FIG. 3) along the surface of the faceplate 102f. The mounting holes 302-308 may be used in conjunction with a fastener, (i.e., screw, nail, rivet, etc.) to couple the weatherproof cover housing 102 to a wallbox or device box.

Figure 10:
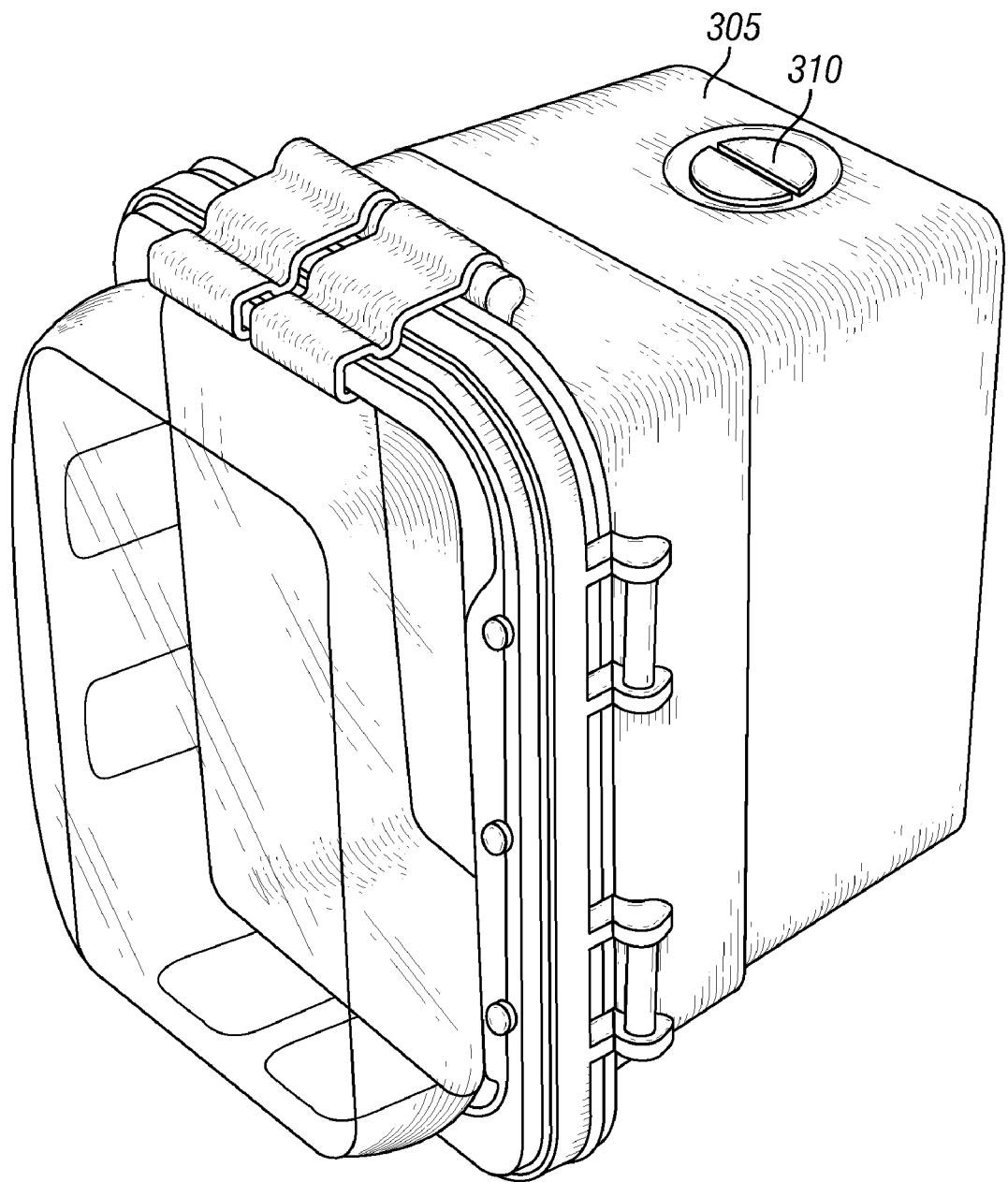
FIG. 10 is a perspective view of a sealed device with integral weatherproof cover coupled to a surface mounted conduit box according to one exemplary embodiment of the present invention.

In an alternative embodiment, the weatherproof cover 100 is mounted to a surface mounted wall box 305, as shown in FIG. 10. In this alternative mounting arrangement, the integral nature of the device 104 with the weatherproof cover 100 protects the device 104 from moisture that can enter between the weatherproof cover housing 102 and the surface mounted wallbox 305 or through the conduit openings 310 on the top, bottom (not shown), or back side (not shown) of the surface mounted wallbox 305.

Figure 4:
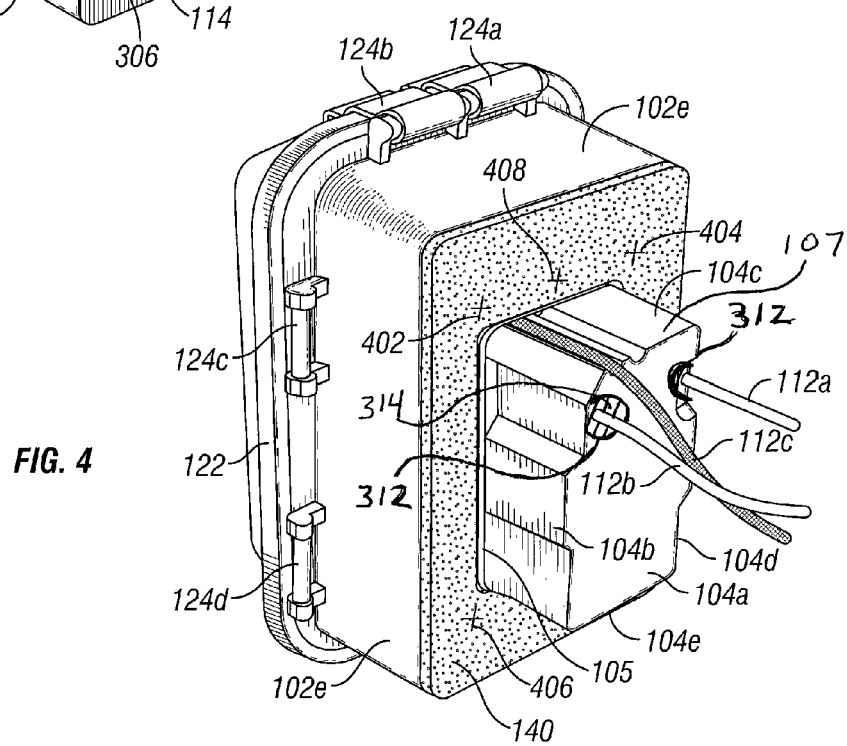
FIG. 4 is the rear perspective view of the sealed device with integral weatherproof cover of FIG. 3 further including a sealing gasket according to one exemplary embodiment of the present invention.
Figure 5:
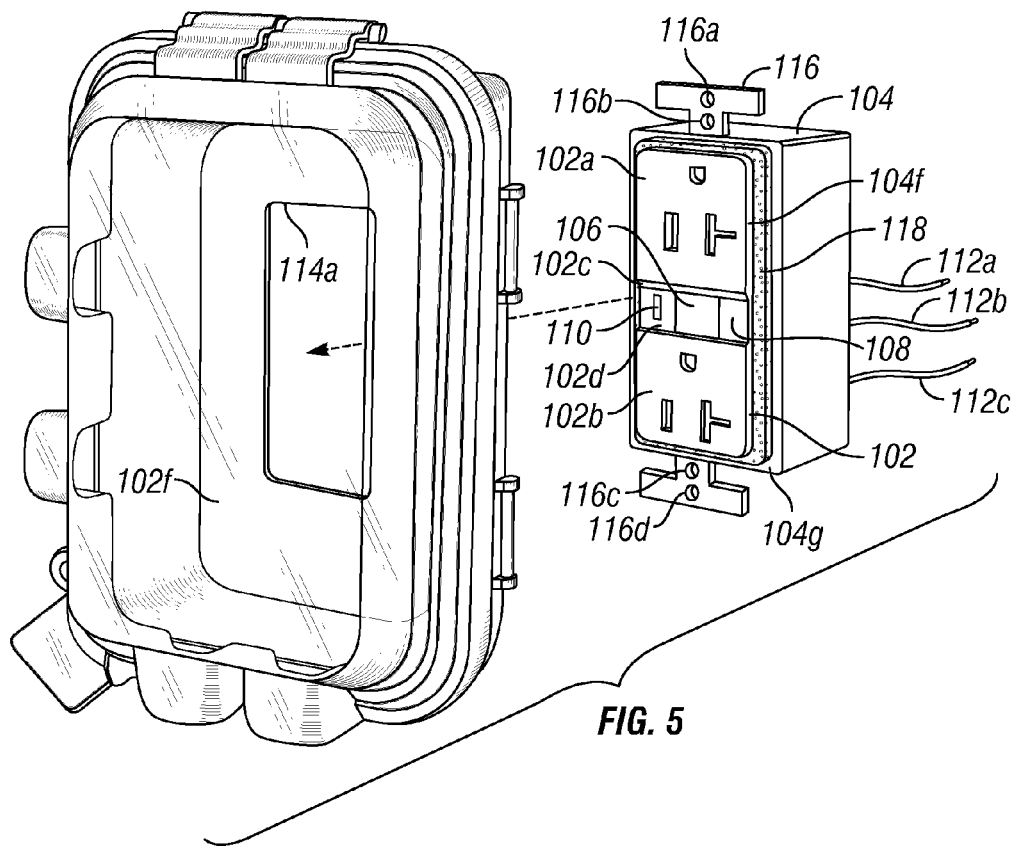
FIG. 5 is a partially exploded front perspective view of the sealed device and replaceable weatherproof cover in accordance with one exemplary embodiment of the present invention.

As shown in FIG. 3, the exemplary weatherproof cover housing 102 further includes a first pair of hinge assemblies 124a and 124b disposed collinear to each other along an outer surface of the top side wall 102e. In an alternative embodiment, as shown in FIGS. 3 and 4, another pair of hinge assemblies 124c and 124d may be positioned along an outer surface or edge of a side wall 102e of the weatherproof cover housing 102. In one exemplary embodiment, the hinge assemblies 124a, 124b, 124c, and 124d are permanently affixed to the weatherproof cover housing 102. Preferably, the hinge assemblies 124a, 124b, 124c, and 124d are molded together with the weatherproof cover housing 102 to form a unitary or integral structure. In one exemplary embodiment, the hinge assemblies 124a, 124b, 124c, and 124d include a hinge pin disposed parallel to an adjacent wall 102e of the weatherproof cover housing 102. Each end of the hinge pin is mounted on an arm that extends generally in a perpendicular manner from the outer surface of the adjacent wall 102e of the weatherproof cover housing 102.

The hinge assemblies, typically comprising a pair, may be laterally spaced-apart from each other as shown by the pair of hinge assemblies 124c and 124d. In an alternative embodiment, the hinge assemblies may be positioned immediately adjacent to each other so that the inboard ends of the two hinge pins are mounted on a common arm, as in the case of the first pair of hinge assemblies 124a and 124b. While the exemplary weatherproof cover housing 102 includes pairs of hinge assemblies, it is to be understood that a weatherproof cover housing 102 having only one hinge assembly or more than two hinge assemblies positioned on the outer surface of one of the side walls 102e is within the spirit of the present invention.

In an exemplary embodiment, the hinge assemblies 124a and 124b and/or 124c and 124d include respective biasing elements (not shown) such as, for example, torsion springs, so that the hinge assemblies 124a and 124b and/or 124c and 124d apply biasing forces against the door 122, urging the door 122 towards the weatherproof cover housing 102 to place the door 122 in the closed configuration, or to effect contact between the latching flange 138 and the tab 132.

Referring to FIG. 4, in an exemplary embodiment, the weatherproof cover 100 also includes a gasket 140 coupled to the back side 114 of the faceplate 102f of the weatherproof cover housing 102. The gasket 140 is coupled to the back side 114 of the faceplate 102f through the use of adhesives or other known methods. The gasket 140 is generally disposed between the structure wall (not shown) and the back side 114 of the faceplate 102f, and helps to limit the amount of water, or other materials, that gains access to the exterior of the device 104, the interior of the wallbox, and/or the interior of the structure wall, between the faceplate 102f and the structure wall, when the weatherproof cover 100 is coupled to the wallbox. However, those of ordinary skill in the art will recognize that, in the event of water seeping between the back side 114 of the faceplate 102f and the structure, the water, or other environmental contaminants, will not be able to enter the device 104 because the interface 105 and the openings for the wires 112a-112c are environmentally sealed. The gasket 140 includes slits 402-408 (and fifth and sixth slits not shown) that extend through the gasket 140 and are positioned substantially in-line with the mounting holes 302-308 (of FIG. 3) on the faceplate 102f. When screws or other fasteners are not placed through a particular mounting hole 302-308 in the faceplate 102f, the particular slit 402-408 in the gasket 140 remains closed and the mounting hole 302-308 remains sealed by the gasket 140. Conversely, when a screw or other fastener is placed though a particular mounting hole 302-308, the corresponding slit 402-408 allows the fastener to pass though the particular slit 402-408 and the gasket 140 provides a seal around the portion of the fastener that passes through the slit 402-408. In several exemplary embodiments, instead of, or in addition to the foregoing, the gasket 140 may include a wide variety of sealing elements such as, for example, an o-ring. In addition, in several exemplary embodiments, the gasket 140 may comprise a wide variety of cross-sections and/or profiles.

Figure 2:
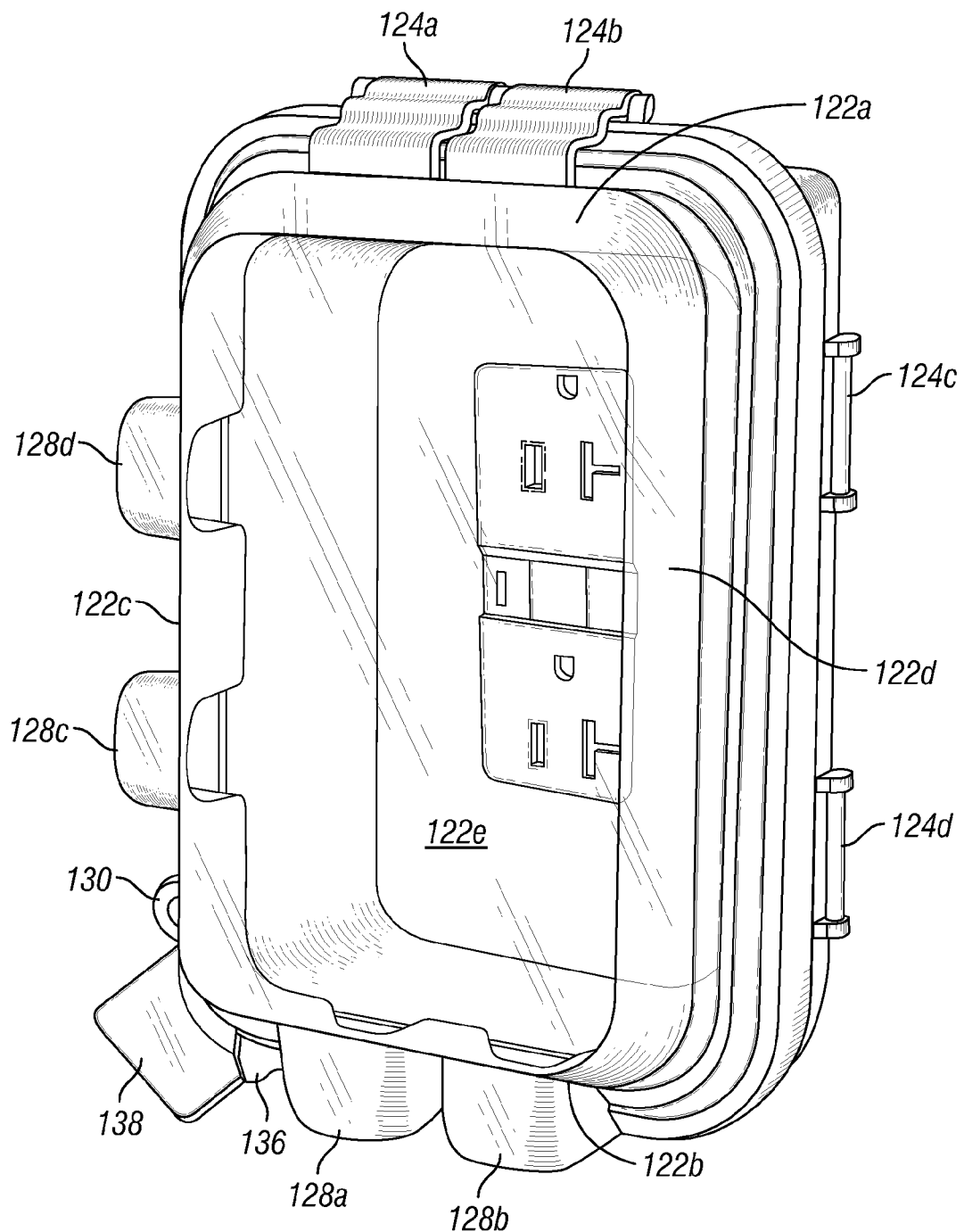
FIG. 2 is a front perspective view of the sealed device with integral weatherproof cover in a closed configuration in accordance with one exemplary embodiment of the present invention.

The exemplary weatherproof cover housing 102 of FIGS. 1-4 also includes a door 122 positioned along the front of the weatherproof cover housing 102. The door 122 has a generally box-like configuration with a front door wall 122e, a top door wall 122a, a right-side door wall 122d, a bottom door wall 122b, and a left-side door wall 122c. The top 122a, bottom 122b, right 122d, and left 122c door walls extend rearward from the front door wall 122e. Preferably the top 122a, bottom 122b, right 122d, and left 122c door walls slope outwards so that the surface area of the plane defined by the limits of the door walls is larger than the front door wall 122e. The door 122 has a length, width, and depth sufficient in size to accommodate electrical connectors generally used in the electrical industry (e.g., plugs or electrical cords) even when the door 122 is in the closed position (as shown in FIG. 2).

The door 122 is dimensioned to enable it to engage the weatherproof cover housing 102 to protect the electrical receptacles 102a and 102b from at least some environmental contaminants when the door 122 is in the closed position. The door 122 is also dimensioned to allow it to be rotatably coupled to the hinge assemblies 124a and 124b or 124c and 124d. The door 122 can be constructed by conventional methods using materials suitable for use in a weatherproof cover 100, such as composites or plastics. In one exemplary embodiment, the door 122 is molded from clear plastic, or a similarly transparent material, to allow for viewing of the interior of the weatherproof cover housing 102 even when the door 122 is in the closed position. In one exemplary embodiment, the door 122 is further dimensioned to form a weatherproof seal with the weatherproof cover housing 102 when the door 122 is in the closed position.

The door 122 further includes one or more cable openings 128a-128d to allow the connection of an electrical connector (not shown) to a device receptacle 102a and 102b. In one exemplary embodiment, the cable openings 128a-128d are covered by a removable cable cap (not shown) when not in use. The cable openings 128a-128d are dimensioned to allow a cable coupled to the electrical connector to pass through the cable opening 128a-128d when the door 122 is in the closed position. The cable openings 128a, 128b, 128c, and 128d can also be dimensioned to hold the cable of the electrical connector in place without excessive pressure or stress being applied to it. In one exemplary embodiment, the door 122 has a first pair of spaced-apart cable openings 128a and 128b and another pair of spaced-apart cable openings 128c and 128d. In one exemplary embodiment, the cable openings 128a, 128b, 128c, and 128d are generally U-shaped cut-outs extending from the lip of a door wall and into an adjacent portion of that door wall.

The weatherproof cover housing 102 can also include a latch mechanism to help keep the door 122 in the closed position. The latch mechanism includes a tab 132 extending outwards from an outer surface of the weatherproof cover housing 102. In one exemplary embodiment, the tab 132 is positioned on a bottom corner of the weatherproof cover housing 102 which is not adjacent to a hinge assembly. The latch mechanism 132 also includes a latch flange 138 extending outward from the outer surface of the door 122 adjacent to the door opening. The latch flange 138 extends outward from the door 122, at a distance sufficient to allow the distal end of the latch flange 138 to engage the tab 132 when the door 122 is in the closed position. In one exemplary embodiment, as the door 122 is moved into the closed position, the latch flange 138 engages the tab 132. A latch handle (part of the latch flange 138 shown in FIG. 2) extends outward from the distal end of the latch flange 138 to assist in opening and closing the door 122. The latch mechanism 132 is released by pulling the handle in the direction of pivoting movement of the door 122.

The latch mechanism 132 can also include a locking assembly to prevent access to the device receptacles 102a and 102b. The locking assembly can include an upper padlock hole 130 in the latch flange 138 and a lower padlock hole 134 in the tab 132. The padlock holes 130 and 134 register with each other when the door 122 is in the closed position. A suitable locking device (not shown), such as a padlock, may be placed through the padlock holes 130 and 134 to lock the door 122 in the closed position to the weatherproof cover housing 102.

As discussed above, the door 122 is rotatably coupled to the weatherproof cover housing 102 by way of the hinge assemblies 124a and 124b or 124c and 124d, which allow the door 122 to be manipulated from an open position, as shown in FIG. 1, to a closed position, as shown in FIG. 2. Furthermore, in certain exemplary embodiments, one or more sealing elements (not shown) such as, for example, gaskets, may be coupled to the door 122 so that, when the door 122 is in the closed configuration, the gaskets sealingly engage the door 122 and the walls 102e of the weatherproof cover housing 102. In an alternative exemplary embodiment, one or more sealing elements (not shown) such as, for example, gaskets, may be coupled to one or more of the walls 102e of the weatherproof cover housing 102 so that, when the door 122 is in the closed configuration, the gaskets sealingly engage the door 122 and the walls 102e.

In the exemplary weatherproof cover 100, a single gang receptacle 102a and 102b is included along the front face of the device 104 and a portion of the single gang receptacle 102a and 102b is positioned within the volume defined by the side walls 102e and the faceplate 102f. The faceplate 102f includes an opening 114a through which the electrical receptacles 102a and 102b are adapted to extend through or provide accessibility to through the use of a plug or other electrical connector. The shape of the opening 114a is generally rectangular, but can take on other geometric shapes based on the needs of the particular application and the shape of the electrical receptacles 102a and 102b.

In an exemplary embodiment, the weatherproof cover 100 is installed in a conventional manner in an outdoor environment, an indoor environment and/or any combination thereof. In operation, the device 104 operates, in a conventional manner, as a GFCI device. The environmental sealing of the device 104 to the weatherproof cover housing 102 provides a generally weatherproof or weather-resistant seal, generally preventing foreign material such as, liquid, water, rainwater, wind-driven rainwater, or other environmental contaminants from passing between the weatherproof cover housing 102 and the device 104. In addition, environmentally sealing the wire leads 112a, 112b, and 112c provides a generally weatherproof or weather-resistant seal from foreign material, such as water, rainwater, wind-driven rainwater, or other environmental contaminants that have passed between the structure wall (not shown) and the back side 114 of the faceplate 102f and prevents that material from accessing the interior of the device 104.

In certain exemplary embodiments, instead of, or in addition to a GFCI device, the weatherproof cover 100 may be in the form of, and/or include, a wide variety of electrical devices and/or combinations thereof, including, for example, a wide variety of wiring devices, a wide variety of combination devices, a wide variety of duplex-style combination devices, a wide variety of decorator-style combination devices, one or more nightlights, one or more single-pole switches, one or more receptacle outlets, one or more dimmers, one or more three-way switches, one or more single-pole double combination switches, one or more single-pole triple combination switches, and other receptacles, and/or any combination thereof.

In an alternative embodiment, the weatherproof cover housing 102 is replaceable or removable from the device 104. In this alternative embodiment, the weatherproof cover housing 102 is sealed to the device 104 by placing a gasket 118 therebetween. FIGS. 5-8 show perspective and cross-sectional views of the device 104 and replaceable weatherproof cover housing 102 for the cover 100 according to one alternative exemplary embodiment of the present invention. While a substantial portion of the cover 100 of FIGS. 5-8 is substantially similar as that described with reference to FIGS. 1-4, the differences will be described hereinafter.

Now referring to FIGS. 5-8, the alternative weatherproof cover includes a mounting strap 116 that is coupled to the device 104 and includes fastening apertures, such as holes, 116a-d, through which fasteners (not shown) are adapted to extend to mount the device 104 to a wallbox or electrical outlet box, and for mounting the weatherproof cover housing 102 to the device 104. In one exemplary embodiment, fasteners can be positioned through the mounting holes 602 and 606 and through the fastening apertures 116b and 116c respectively to couple the cover housing 102, the device 104 and the wallbox together. In an alternative embodiment, the device 104 can be coupled to the wallbox by positioning fasteners though the fastening apertures 116b and 116c and into corresponding holes in the wallbox. Then, the cover housing 102 can be coupled to the device 104 by positioning fasteners through the mounting holes 604 and 608 into corresponding tapped fastener apertures 116a and 116d respectively. In yet another embodiment, the device 104 is coupled to the wallbox as stated above, and the cover housing 102 is coupled to the wallbox by positioning fasteners through the mounting holes 610-616 and into corresponding tapped holes in the wallbox. The faceplate 102f of the weatherproof cover housing 102 includes an aperture 114a for receiving therethrough and allowing the edges of the faceplate 102f about the aperture 114a to extend about the electrical receptacles 102a and 102b.

The device 104 further includes an external shoulder 104f extending generally outward from a front plate 104g of the device 104. In certain exemplary embodiments, the external shoulder 104f is positioned adjacent to, and extends generally perpendicular to, the faceplate 102f of the weatherproof cover housing 102. A sealing element, such as a rim gasket 118, is disposed against the external shoulder 104f. The gasket 118 can be made from natural or synthetic solid or foam rubber, foam plastic, or cork. Those of ordinary skill in the art will recognize that other materials known in the art may be used in place of the selected gasket material and/or other sealing elements including, but not limited to, o-rings or caulk.

The gasket 118 extends along the external shoulder 104f and about the faceplate 102f of the weatherproof cover housing 102 so that a portion of the gasket 118 extends through the aperture 114a of the faceplate 102f to provide a releasable environmental seal between the weatherproof cover housing 102 and the device 104. While not shown, in an alternative embodiment, instead of the device 104 including the external shoulder 104f, the weatherproof cover housing 102 is configured to include an external shoulder (not shown) in substantially the same position as the external shoulder 104f, and the gasket 118 extends along the shoulder of the weatherproof cover housing 102. In certain exemplary embodiments, the gasket 118 may have a wide variety of shapes, sizes, thicknesses, cross-sections, and profiles.

In one exemplary embodiment, the gasket 118 abuts, or is at least proximate, the back side of the faceplate 102f of the weatherproof cover housing 102. In certain exemplary embodiments, the gasket 118 abuts the back side of the faceplate 102f and is stretched about the electrical receptacles 102a and 102b so that an interference fit is formed between the gasket 118 and a portion of the perimeter of each of the electrical receptacles 102a and 102b, thereby generally securing the gasket 118 in place. In this embodiment, or in an alternative embodiment, a layer of adhesive (not shown) is disposed between the gasket 118 and the external shoulder 104f, thereby generally securing the gasket 118 to the device 104.

Figure 6A:
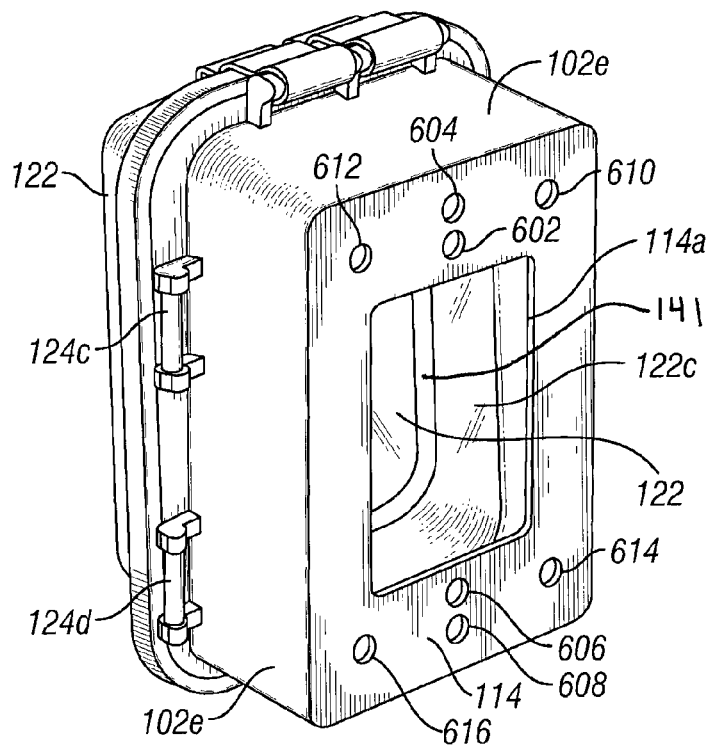
FIG. 6A is a rear perspective view of the replaceable weatherproof cover housing in accordance with one exemplary embodiment of the present invention.
Figure 6B:
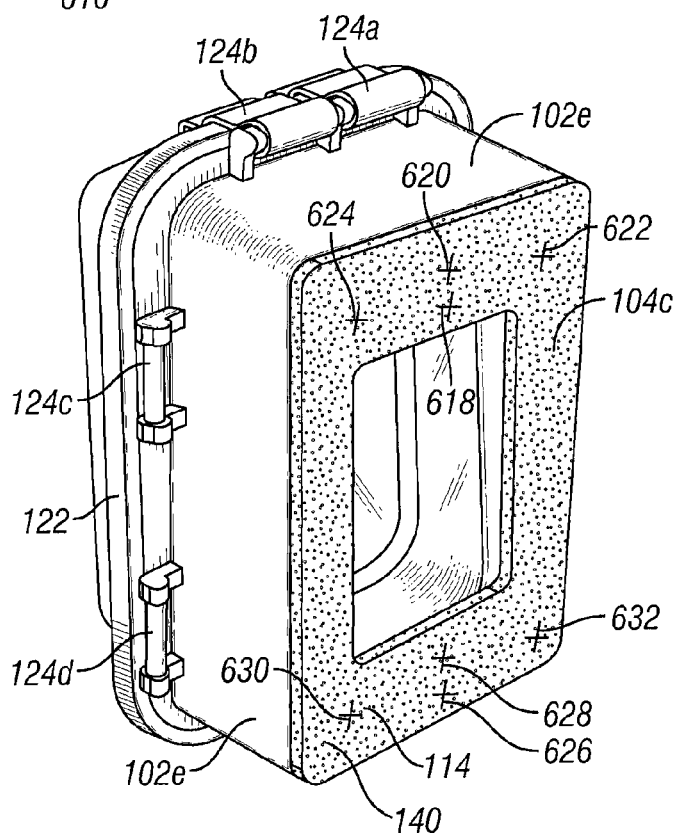
FIG. 6B is another rear perspective view of the replaceable weatherproof cover housing with a gasket coupled to the backside of the faceplate in accordance with one exemplary embodiment of the present invention.
Figure 7:
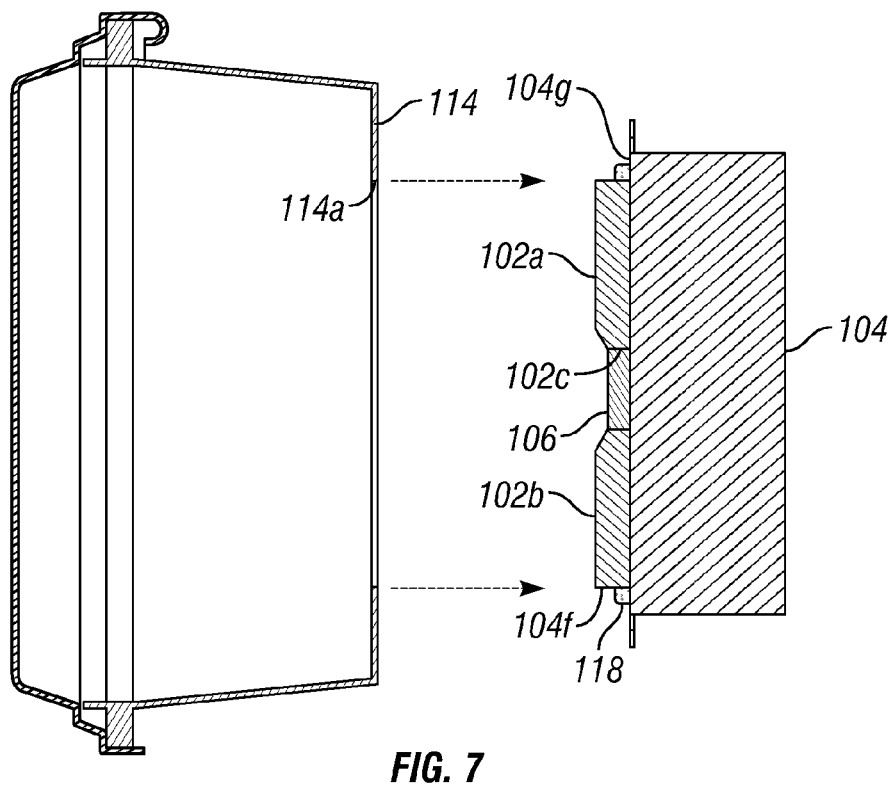
FIG. 7 is a partially exploded sectional view of the sealed device and weatherproof cover, according to the exemplary embodiment of FIG. 5.

As discussed above, the faceplate 102f of the replaceable weatherproof cover housing 102 includes the aperture 114a. The shape of the aperture 114a is generally rectangular and the shape of the gasket 118 generally corresponds to the shape of the aperture 114a. However, those of ordinary skill in the art will recognize that the aperture 114a can have other geometric shapes, such as circular, oval, or square, and can generally correspond to the shape of the external shoulder 104f and the shape of the electrical receptacles 102a and 102b. Further, the gasket 118 can have a corresponding shape to that of the aperture 114a. The faceplate 102f also includes one or more mounting holes 602-608 (in FIG. 6A) generally positioned to be adjacent one of the fastening apertures 116a-d, through which fasteners (not shown) are adapted to extend therethrough to mount the replaceable weatherproof cover housing 102 to the device 104 and or to the structure. In addition, the faceplate 102f also includes one or more mounting holes 610-616 (of FIG. 6A). Referring to FIG. 6B, the gasket 140 includes slits; 618-632 that extend through the gasket 140 and are positioned substantially in-line with the mounting holes 602-616 (of FIG. 6A). When screws or other fasteners are not placed through a particular mounting hole 602-616 in the faceplate 102f, the particular corresponding slit 618-632 in the gasket 140 remains closed and the mounting hole 602-616 remains sealed by the gasket 140. Conversely, when a screw or other fastener is placed though a particular mounting hole 602-616, the corresponding slit 618-632 allows the fastener to pass though the particular slit 618-632 and the gasket 140 provides a seal around the portion of the fastener that passes through the slit 618-632.

Figure 8:
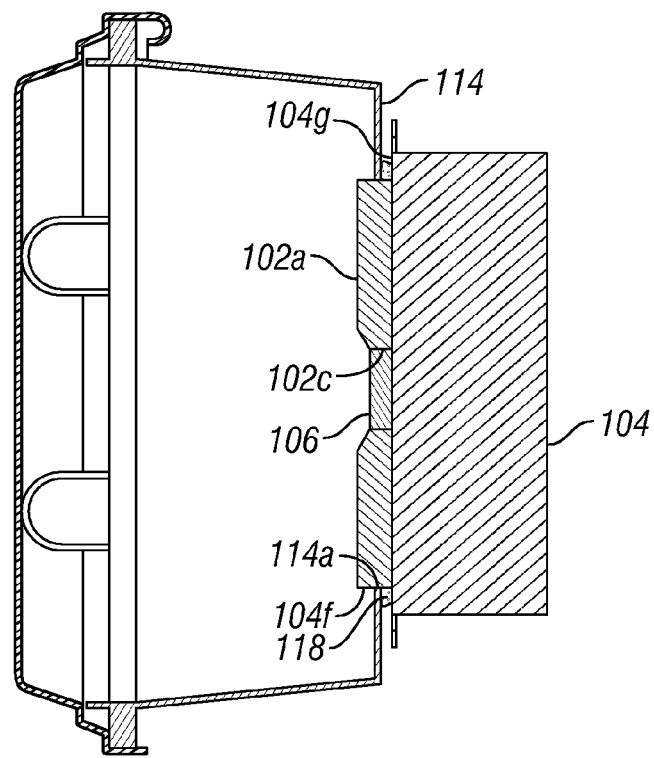
FIG. 8 is a sectional view of the assembly of the weatherproof cover and sealed device according to the exemplary embodiment of FIG. 5.

When the replaceable weatherproof cover housing 102 is coupled to the device 104, as illustrated in FIG. 8, the weatherproof cover housing 102 is positioned so that the electrical receptacles 102a and 102b extend though the aperture 114a of the faceplate 102f and the gasket 118 is at least partially compressed between the faceplate 102f and the external shoulder 104f. In an exemplary embodiment, the faceplate 102f is so positioned as a result of a conventional coupling between the faceplate 102f and the device 104 and/or the mounting strap 116, wherein the coupling creates a weatherproof seal about the perimeter of the aperture 114a.

As a result of the gasket 118 being at least partially compressed between the faceplate 102f and the external shoulder 104f, the gasket 118 sealingly engages both the external shoulder 104f and the faceplate 102f, providing a weatherproof seal therebetween and about the perimeter of the aperture 114a. The weatherproof seal generally prevents foreign material such as, liquid, water, rainwater, wind-driven rainwater, or other environmental contaminants from passing between the weatherproof cover housing 102 and the device 104. In one exemplary embodiment, in addition to sealingly engaging the external shoulder 104f and the faceplate 102f, the gasket 118 sealingly engages the faceplate 102f to the outer perimeter of the electrical receptacles 102a and 102b creating a weatherproof seal about the perimeter of the electrical receptacles 102a and 102b, such that liquid, water, rainwater, wind-driven rainwater, or other environmental contaminants are unable to pass between the weatherproof cover housing 102 and the device 104 to access the interior of the device 104.

In the alternative embodiment described above with reference to FIGS. 5-8, the device 104 is installed in a conventional manner in an outdoor environment, an indoor environment, and/or any combination thereof. Further, one weatherproof cover housing 102 may be removably decoupled from the device 104 and replaced with another weatherproof cover housing 102. Once the weatherproof cover housing 102 is coupled to the device 104 the combination creates a weatherproof cover 100 that provides a generally weatherproof or weather-resistant seal, generally preventing foreign material such as, liquid, water, rainwater, wind-driven rainwater, or other environmental contaminants from passing between the weatherproof cover housing 102 and the device 104 and gaining access to the interior of the device 104. In addition, as set forth above with regards to FIGS. 1-4, environmentally sealing the wire leads 112a, 112b, and 112c provides a generally weatherproof or weather-resistant seal from foreign material, such as water, rainwater, wind-driven rainwater, or other environmental contaminants that have passed between the structure wall (not shown) and the back side 114 of the faceplate 102f of the weatherproof cover housing 102 and prevents that material from accessing the interior of the device 104. Thus, the weather-resistance of the device 104 is no longer dependent on the seal integrity of the gasket 140 between the back side 114 of the faceplate 102f and the wall structure.

Figure 9A:
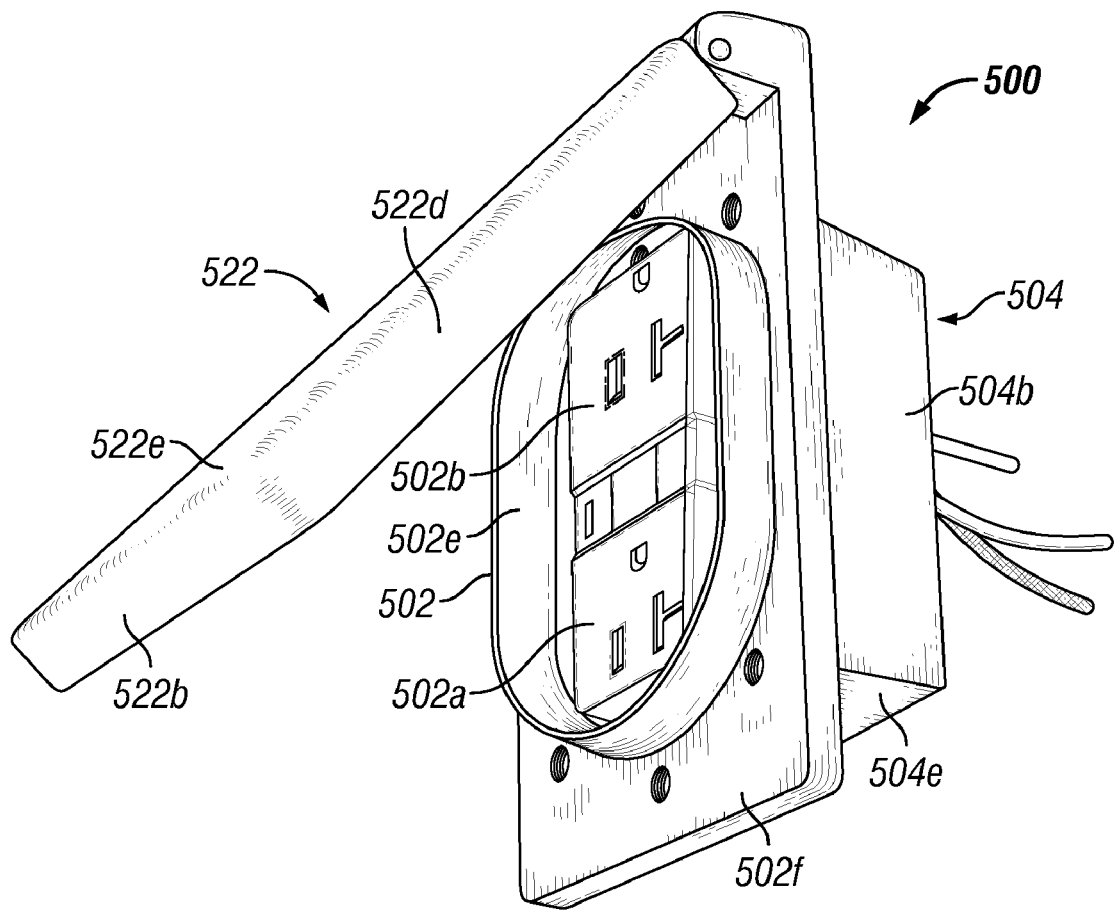
FIGS. 9A and 9B are perspective views of a weatherproof while not in use cover with integral device according to an alternative exemplary embodiment of the present invention.
Figure 9B:
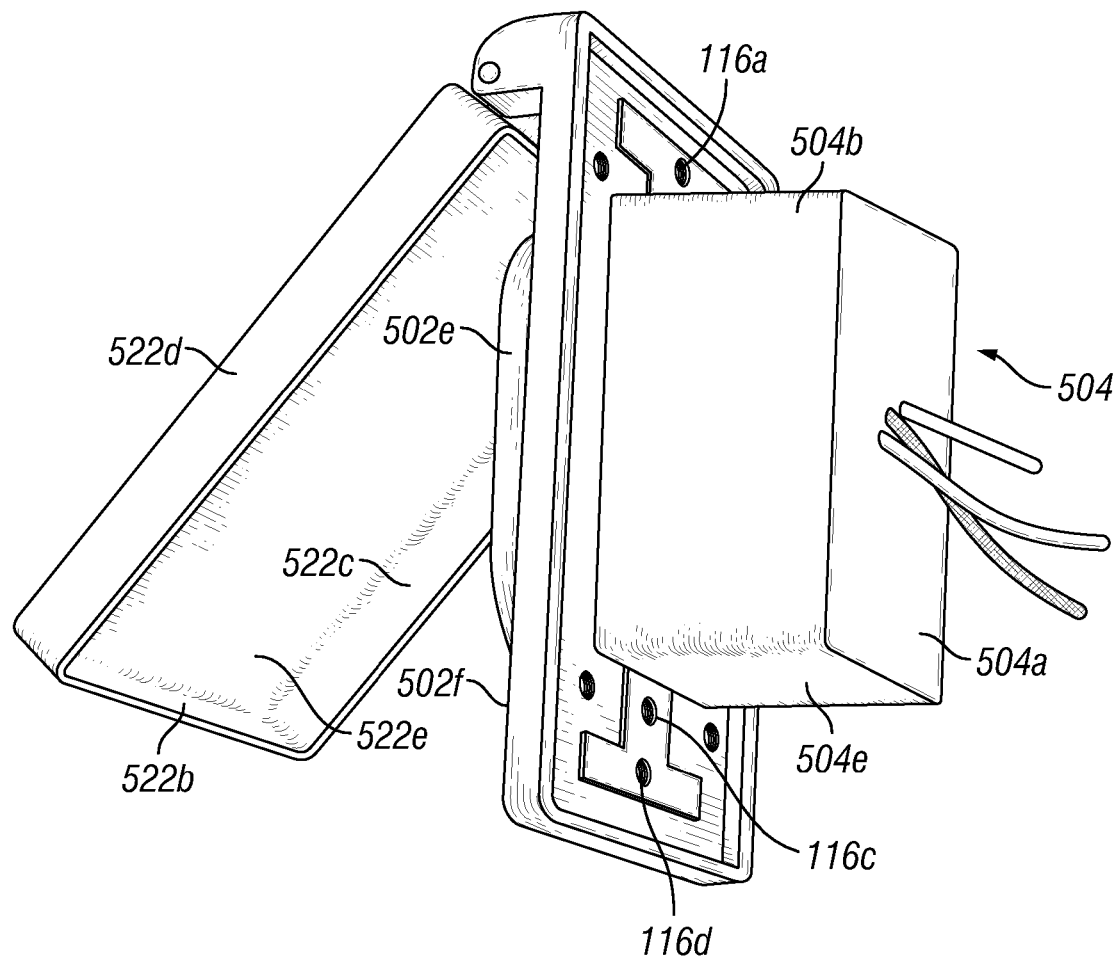

In an alternative embodiment, as shown in FIGS. 9A and 9B, the device 504 can be designed to be coupled with a weatherproof while not in use cover. In this embodiment, the weatherproof while not in use cover housing 502 includes a faceplate 502f and a wall 502e extending out therefrom. In the exemplary embodiment of FIGS. 9A and 9B, the wall 502e has an oval shape and is positioned about the device receptacles 502a and 502b. The weatherproof while not in use cover housing 502 is coupled to the device 504 in substantially the same manner as discussed with regards to the exemplary embodiment of FIGS. 5-8 above, and the device 504 is the same or substantially similar to that discussed with regards to the other embodiments herein. For example, the device 504 includes a back plate 504a having a generally rectangular shape and four walls 504b, 504c (not shown), 504d (not shown), and 504e.

A door 522 is rotatably coupled to the faceplate 502f. The door 522 includes sides 522a-522d that extend out from a front wall 522e of the door 522. In this alternative embodiment, the space between the front wall 522e of the door and the faceplate 502f is generally not sufficient to allow an electrical connector to be attached to the device receptacle 502a or 502b and allow the door 522 to remain in a closed configuration. However, the sides 522a-522d extend out from the front wall 522e towards the faceplate 502f a sufficient amount such that sides 522a-522d overlap the plane of the faceplate 502f to help exclude rain from entering in between the door 522 and the faceplate 502f. Further, the weatherproof while not in use cover of FIGS. 9A and 9B can be replaceable as taught above with regards to FIGS. 5-8 and coupled to the surface mounted junction box of FIG. 10.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:
1. A weatherproof electrical enclosure comprising:
a wiring device comprising a device body comprising a plurality of sides:
a shoulder extending out from one of the sides of the device body;
a sealing element disposed along the shoulder;
a plurality of electrical wires, a first end of each of the wires being electrically coupled to the wiring device within the device body and each opposing end of the wires extending through an aperture in one of the plurality of sides of the device body, each of said apertures being environmentally sealed;
a weatherproof cover housing comprising:
a faceplate and a plurality of side walls extending from the faceplate
a first aperture disposed through the faceplate;
a second aperture defined by the side walls;
wherein the weatherproof cover is coupled to the wiring device adjacent the faceplate with at least a portion of the wiring device disposed through the first aperture;
wherein the sealing element is positioned between a portion of and sealingly engages the weatherproof cover and the shoulder of the wiring device;
wherein the sealing element provides an environmental seal between the faceplate of the weatherproof cover and at least a portion of one of the sides of the wiring device; and
a door rotatably coupled to the weatherproof cover, wherein the door is adjustable from an open position to a closed position and wherein the door is disposed adjacent to the second aperture in the closed position.

2. The weatherproof electrical enclosure of claim 1, further comprising a gasket disposed about at least a portion of the first aperture and at least a portion of the wiring device, wherein the gasket provides an environmental seal between the weatherproof cover and a support structure.

3. The weatherproof electrical enclosure of claim 1, wherein the weatherproof cover comprises:
the faceplate having a first side and a second side and comprising the first aperture, wherein at least a portion of the first side of the faceplate is disposed against the sealing element.

4. The weatherproof electrical enclosure of claim 1, wherein the door further comprises at least one cable opening disposed in at least one of the side door walls.

5. The weatherproof electrical enclosure of claim 1, further comprising a latch mechanism comprising:
a tab extending outwards from at least one of the walls of the weatherproof cover; and
a latch flange extending outward from at least one of the side door walls; wherein the latch flange extends from the door at a distance sufficient to allow the latch flange to engage the tab when the door is in a closed position.

6. The weatherproof electrical enclosure of claim 1,
wherein the shoulder extends about the portion of the wiring device that extends through the first aperture of the weatherproof cover; and
wherein the sealing element extends about the portion of the wiring device that extends through the first aperture of the weatherproof cover.

7. The weatherproof electrical enclosure of claim 1, wherein the shape of the sealing element generally comprises the shape of the first aperture of the weatherproof cover.

8. The weatherproof electrical enclosure of claim 1, wherein the wiring device comprises a ground fault circuit interrupter ("GFCI") device.

9. The weatherproof electrical enclosure of claim 1, wherein the sealing element comprises a gasket.

10. The weatherproof electrical enclosure of claim 1, wherein the sealing element comprises an o-ring.

11. The weatherproof electrical enclosure of claim 1, wherein the environmental sealing of each of said apertures in the wiring device for the plurality of electrical wires is done with one of solvent, welding, ultrasonic welding, pressure fitting, or cork.

12. The weatherproof electrical enclosure of claim 1, wherein the environmental sealing of each of said apertures in the wiring device for the plurality of electrical wires is done with one of sealant, caulk, an o-ring, a gasket material, or a membrane.

13. The weatherproof electrical enclosure of claim 1, wherein the environmental sealing of each of said apertures in the wiring device for the plurality of electrical wires is done with caulk comprising silicone rubber.

14. A weatherproof electrical enclosure comprising:
a wiring device comprising:
at least one electrical receptacle to allow for releasably coupling a plug;
a device body comprising a plurality of sides; and
a plurality of electrical wires, each wire comprising a first end positioned within the device body, a second end disposed outside of the device body, and an intermediate portion disposed therebetween;
wherein the at least one electrical receptacle is disposed along an exterior of one of the sides of the device body;
wherein the first end is electrically coupled to the electrical receptacle and the intermediate portion extends through an aperture in the device body, each of said apertures being environmentally sealed; and
a shoulder extending outward from and about a portion of one of the sides of the device body;
a sealing element positioned about at least a portion of the shoulder;
a removable weatherproof cover housing comprising:
a faceplate and a plurality of side walls
a first aperture provided through the faceplate;
a second aperture defined by the plurality of side walls;
wherein the faceplate of the weatherproof cover is releasably coupled to the wiring device;
wherein at least a portion of the wiring device is positioned through the first aperture in the faceplate;
wherein the sealing element is positioned between at least a portion of the faceplate of the weatherproof cover and the shoulder of the wiring device and provides an environmental seal between the faceplate of the weatherproof cover and the wiring device; and
a door rotatably coupled to the weatherproof cover, said door operable between an open position and a closed position.

15. The weatherproof electrical enclosure of claim 14, wherein the removable weatherproof cover further comprises:
the faceplate having a first side, a second side, and the first aperture, wherein at least a portion of the first side of the faceplate is disposed against the sealing element; and
the plurality of walls extending out from the second side of the faceplate.

16. The weatherproof electrical enclosure of claim 14, wherein the shoulder extends about at least the portion of the wiring device extending though the first aperture of the weatherproof cover and the sealing element extends about the portion of the wiring device that extends through the first aperture of the weatherproof cover.

17. The weatherproof electrical enclosure of claim 14, wherein the shape of the sealing element substantially comprises the shape of the first aperture of the weatherproof cover.

18. The weatherproof electrical enclosure of claim 14, wherein the sealing element comprises a gasket.

* * * * *